Aug. 5, 1947.    A. P. NICOLETTE    2,425,070
AIR ELIMINATOR
Filed Oct. 30, 1944
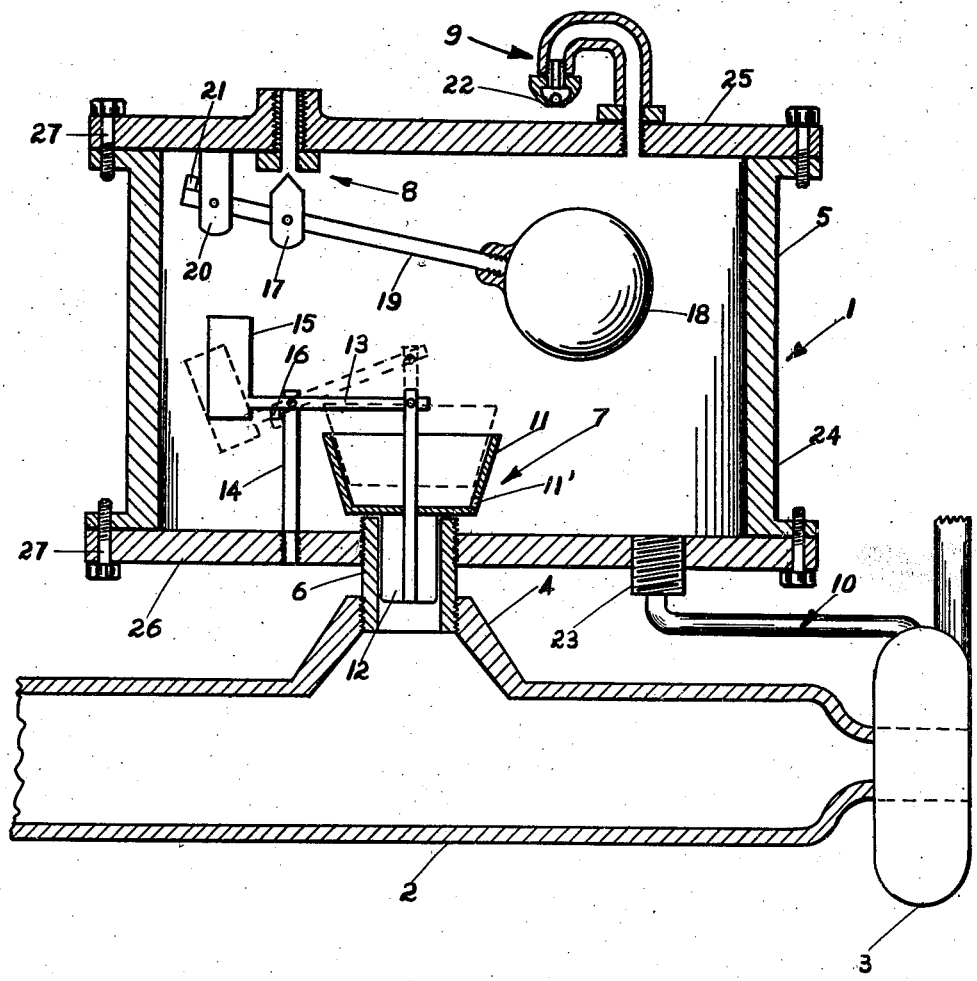
INVENTOR.
ARTHUR P. NICOLETTE
BY
A. Schapp
ATTORNEY Patented Aug. 5, 1947

2,425,070

UNITED STATES PATENT OFFICE 2,425,070

AIR ELIMINATOR

Arthur P. Nicolette, Albany, Calif.

Application October 30, 1944, Serial No. 560,994

7 Claims. (Cl. 103—113)

The present invention relates to improvements in air eliminators, and has particular reference to a device for eliminating air from a conduit or line on the suction side of a pump.

In installations of this character the line leading to the suction side of the pump may be fed, from time to time, by trucks or otherwise, to bring the liquid to the pump, for further advance by the latter, and during the intervals between operations, the line, which may consist of a pipe conduit and a flexible conduit coupled thereto, may fill with air which interferes with proper pump operation.

My device is intended to relieve the line of the air and to allow the liquid advancing toward the pump to crowd out the air and to permit the entire line to fill with a compact body of liquid.

It is further proposed to provide an air eliminator of the character described that is automatic in operation; that will open automatically after pump action ceases to allow the air to escape when the line is filled with liquid, that will automatically limit the amount of liquid entering the device, will automatically close when liquid is withdrawn from the device and will re-open for completing the cycle after pumping action has ceased.

Further objects and advantages of my invention will appear as the specification proceeds, and the novel features of my air eliminator will be fully defined in the claims hereto appended.

The preferred form of my invention is illustrated in the accompanying drawing forming part of this application, in which the figure shows a vertical section through my air eliminator.

While I have shown only the preferred form of my invention, it should be understood that various changes or modifications may be made within the scope of the claims hereto attached, without departing from the spirit of the invention.

Referring to the drawing in detail, my air eliminator 1 is intended for attachment to a line 2 leading to a pump 3. Since its principal object is to eliminate air from the line, it will naturally be attached to the line at its highest point, as indicated at 4, so that all the air from the entire line may be forced toward the air eliminator.

If there are several high points in the line, several air eliminators may be employed.

The line 2 may be such as is employed at service stations, adapted to be fed from trucks, with flexible hose coupled to a rigid pipe line.

When the pump ceases to operate, the pipe line fills with air to a certain extent, and the flexible hose, before coupling, is also filled with air.

The present air eliminator was developed to allow the liquid fed from the truck to drive the air out of the line and to deliver the liquid in compact form to the pump for the latter to act on.

My eliminator comprises in its principal features a chamber 5 having a suitable nipple 6 connecting the same into the pipe line, a valve 7 in the nipple, an air outlet 8, a vent 9, and an outlet connection 10 for pump air to escape.

The valve 7 is in the nature of a cup 11 adapted to rest on the valve seat formed by the upper end of the nipple 6 which is raised slightly above the floor of the chamber.

The stem 12 of the valve extends into the nipple and may be of any suitable shape, such as cross-shape in section, to allow air and liquid to pass freely when the valve is lifted off its seat.

The valve stem projects through the bottom of the cup upwardly to form a suitable attachment for a lever 13 pivoted in a post 14 and carrying a weight 15.

The weight 15 tends to lift the valve and is sufficiently heavy to do so when the valve cup is empty, while it will yield to the weight of the valve when the cup is filled with liquid. The lever 13 has a stop 16 limiting the downward movement of the weight.

The cup is formed with a small outlet 11′ near the bottom thereof.

The air outlet 8 is provided in the top wall of the chamber and is controlled by a valve 17 operated by a float 18 at the end of a rod 19 pivoted in a bracket 20. The downward movement of the float 18 is limited by a stop 21.

The vent tube 9 may be of any suitable form and is controlled by a suitable check valve 22 allowing air to be sucked into the chamber, but preventing either air or liquid from leaving the chamber.

An extra conduit 10 is made to connect the pump, at its highest point, with the bottom of the chamber and this conduit is provided with a check valve 23 allowing air to escape from the pump into the chamber.

In shape and construction, the chamber may be of any suitable form, and is here shown as comprising a cylindrical side wall 24 and top and bottom plates 25 and 26 secured thereto by means of bolts 27.

In operation, the valve 7 normally occupies the open position indicated in dotted lines. At this time the valve 8 is also open, and the pump is not operating.

When the truck driver connects his hose to the pipe line and opens the valve for his hose, the liquid enters the hose and the line and drives the air ahead to the highest point and out through the valve 7, the chamber 5 and the outlet 8.

The liquid, entering the pump, will also drive air contained therein through the conduit 10 and the chamber 5 toward the outlet 8. The liquid itself will follow the flow of the air and enter the chamber 5 until it reaches a level where the float 18 closes the valve 8.

At this time the line and the pump are full of compact liquid and the pump may now be started without any danger of air lock.

As the pump operates it draws the liquid out of the chamber, the valve 9 relieving the vacuum, and, as the level of the liquid lowers, it gradually drops below the upper edge of the cup 11, which is filled with liquid to such an extent that the combined weight of the cup and the valve exceeds that of the weight and causes the valve to close. The valve remains closed, under the suction of the pump, until the latter stops operating.

In the meantime, the cup is slowly drained of its liquid through the small hole 11′, causing the weight to outbalance the valve, and, when sufficient liquid has leaked out for this purpose, and the suction has ceased, the weight again lifts the valve to open position which completes the cycle of operations.

I claim:

1. An air eliminator for a liquid line, comprising a chamber having connection with the line and having a float-controlled outlet, a valve in said connection and having means for normally opening the same, whereby air may escape from the line through the chamber and the outlet, as the line fills with liquid, the float-control being adapted to limit the outflow of air from the chamber whereby the flow of the liquid into the chamber is also limited, a cup on the valve adapted for holding liquid and for closing the valve when the liquid level in the chamber sinks below the level in the cup, and a slow leak in the cup adapted for retarded discharge of the liquid from the cup to permit the latter to yield to the valve-opening means.

2. An air eliminator for a liquid line, comprising a chamber having connection with the line and having a float-controlled outlet, a valve in said connection and having means for normally opening the same, whereby air may escape from the line through the chamber and the outlet, as the line fills with liquid, the float-control being adapted to limit the outflow of air from the chamber whereby the flow of the liquid into the chamber is also limited, a cup on the valve adapted for holding liquid and for closing the valve when the liquid level in the chamber sinks below the level in the cup, and a slow leak in the cup adapted for retarded discharge of the liquid from the cup to permit the latter to yield to the valve-opening means, the chamber having a vent valve for admitting air when the liquid level recedes.

3. In an air eliminator of the character described, a chamber having a valve opening and a valve seat in the bottom thereof, a cup mounted for cooperation with the seat to form a valve therewith and having a stem projecting into the opening, a lever fulcrumed in operative proximity to the cup and having one arm attached thereto and a weight on the second lever arm, the weight being such as to lift the valve when the cup is empty and to be lifted by the valve when the cup is filled with liquid.

4. In an air eliminator of the character described, a chamber having a nipple in the bottom thereof, a cup mounted for cooperation with the nipple to form a valve therewith and having a stem projecting into the nipple, a lever fulcrumed in operative proximity to the cup and having one arm attached thereto and a weight on the second lever arm, the weight being such as to lift the valve when the cup is empty and to be lifted by the valve when the cup is filled with liquid the nipple projecting above the floor of the bottom, and the cup having a slow leak whereby liquid may drain out of the same.

5. In combination, a pump, a liquid line leading thereto, and an air eliminator comprising a chamber having connection with the line on the suction side of the pump and having a float-controlled outlet, a valve in said connection and having means for normally opening the same, whereby air may escape from the line through the chamber and the outlet, as the line fills with liquid, the float control being adapted to limit the flow of the liquid into the chamber, a cup on the valve adapted for holding liquid and for closing the valve when the liquid level in the chamber sinks below the level in the cup, and a slow leak in the cup adapted for retarded discharge of the liquid from the cup to permit the latter to yield to valve-opening means, the chamber having a vent valve for admitting air when the liquid level recedes, and the pump having an air escape passage leading to the chamber with a check valve controlling said passage.

6. In combination, a pump, a liquid line leading thereto, and an air eliminator comprising a chamber having connection with the line, a valve in said connection and biased to be normally open whereby air may escape from the line as the latter is filled with liquid, and means for limiting the flow of liquid into the chamber, the pump having an air escape passage leading to the chamber with a check valve controlling said passage.

7. An air eliminator for a liquid line comprising a chamber having connection with the line, a valve in said connection and having means biasing it to be normally open, whereby air may escape from the line as the latter fills with liquid, means for limiting the outflow of air from the chamber whereby the flow of liquid into the chamber is also limited, the valve being provided with means operable to close it when the liquid level in the chamber is lowered under the influence of suction, the latter means being operable to yield to permit reopening of the valve by the biasing means when suction ceases.

ARTHUR P. NICOLETTE.

REFERENCES CITED

The following references are of record in the file of this patent:

UNITED STATES PATENTS

| Number | Name | Date |
|---|---|---|
| 257,853 | Dibble | May 16, 1882 |
| 1,362,150 | Shealy | Dec. 14, 1920 |
| 1,366,814 | McKillip | Jan. 25, 1921 |
| 1,831,318 | O'Neil | Nov. 10, 1931 |
| 1,890,126 | Moore | Dec. 6, 1932 |
| 1,922,930 | Darms | Aug. 15, 1933 |
| 2,033,981 | Durdin | Mar. 7, 1936 |
| 2,115,499 | Salvoni | Apr. 26, 1938 |

FOREIGN PATENTS

| Number | Country | Date |
|---|---|---|
| 25,178 | Great Britain | Dec. 28, 1894 |